United States Patent [19]
Brucher et al.

[11] 3,727,997
[45] Apr. 17, 1973

[54] SLIDE AND SUPPORT BEARING FOR ROTORS OF LARGE TURBINE MACHINES

[75] Inventors: Adolf Brucher, Mulheim-Ruhr; Rudolf Gemein, Duisberg; Gerold Holzer, Mulheim-Ruhr, all of Germany

[73] Assignee: Kraftwerk Union Aktiengesellschaft, Mulheim(Ruhr), Germany

[22] Filed: Feb. 1, 9172

[21] Appl. No.: 222,570

[52] U.S. Cl. ................................................308/160
[51] Int. Cl. ............................................F16c 41/02
[58] Field of Search...........................308/160, 168

[56] References Cited

FOREIGN PATENTS OR APPLICATIONS 1,273,271  7/1968  Germany............................308/160

Primary Examiner—Charles J. Myhre
Assistant Examiner—Frank Susko
Attorney—Arthur E. Wilfond et al.

[57] ABSTRACT

A slide bearing in the form of a support pressure-bearing for turbine machine shaft members such as the shaft of a steam turbine rotor or the like, the shaft being aligned in the bearing and having a longitudinal shaft axis disposed in a vertical shart plane. The slide bearing includes shaft collars disposed on the shart, a pedestal, and a bearing housing mounted on the pedestal. The housing has mutually adjacent upper and lower housing parts. A bearing structure is disposed in the housing and has a bearing surface for supporting the shaft in the structure. The bearing structure has axial end faces formed as radially extending bearing surfaces for engaging the collars on the shaft for taking up axial pressure forces of the shart. The bearing structure has an additional bearing surface for laterally supporting the structure in the housing. The lower housing part includes a support cantilever mounted on the pedestal. The cantilevered support has a lower spherical dish-like surface bearing for engaging the additional bearing surface of the bearing structure. The support is resilient in a vertical plane containing the shaft axis and is deflectable about a vertical axis in the vertical plane. The support is dimensioned, so that its deformation-counter force acting in the region of the lower-dish like surface bearing at the start of the deflection of the support is less than the friction force between the dish-like surface bearing and the additional bearing surface of the bearing structure developed in response to a shift of the shaft from its aligned position during operation of the turbine. The upper bearing housing part has an upper spherical dish-like surface bearing for engaging the additional bearing surface of the bearing structure. The support is sufficiently resistant to buckling and to axial compressive load acting in the direction of gravity and is sufficiently resistant to bending in a plane normal to the shaft axis and transverse to the vertical shaft plane, so that the bearing structure slides at the upper surface bearing and moves the lower surface bearing of the cantilevered support when the shaft shifts from its aligned position during operation of the turbine. The cantilevered support deflecting with the shift of the shaft provided the shifting force of the shaft in the region of the lower surface bearing is less than the friction force developed between the lower surface bearing and the additional bearing surface of the bearing structure and greater than the deformation counter force of the cantilevered support.

10 Claims, 8 Drawing Figures

SLIDE AND SUPPORT BEARING FOR ROTORS OF LARGE TURBINE MACHINES

The invention relates to a slide bearing configured as a support pressure-bearing for rotors for heavy turbine machines, especially for steam turbine rotors whose bearing body or structure is provided with axial bearing surfaces which carry or support the shaft and whose end faces have radial bearing faces which take up the axial pressure forces of the shaft that are applied by shaft collars. The bearing body is adjustably supported in a bearing housing by spherical surface means. Such a support pressure-bearing is known from German Pat. No. 1,273,271. Such bearings proved very successful in rotors of heavy turbine machines, particularly in steam turbine rotors since they are of sturdy construction and are simple to produce. The spherical adjustability of the bearing body at the bearing housing affords the advantage of being able to obtain a precise alignment during the installation of the shaft. Furthermore, the shaft can perform some angular deviations during operation which are necessary if a deviation from the adjusted alignment of the shaft, should occur. More precisely, during operation, the support pressure-bearing must be resistant to thrust, pulling and bending under the action of high axial and lateral forces. However, the pressure-bearing must be able to yield to an angular movement of the bearing body which is then required if the position of bearing bodies change relative to the shafts as, for example, when the bearing blocks go into an inclined position because of one-sided warming thereof or if changes occur in the operational bending line of the rotors because of steam forces.

Increases in the weight of the shaft, the increase taking place at an increase in the unit output of the turbine, have shown that the spherical adjustability will no longer respond to a satisfactory degree during operation with the aforementioned requirements. Though theoretically, the bearing shell can rotate during operation about the spherical center point and adjust the shaft accordingly. However, in actual practice, this is prevented by the friction. Although the sphere surface lie in oil, there is primarily a metallic contact between them, since the oil is pressed out by the constant pressure. This makes the friction coefficient only slightly less than for dry friction. If the bearing shell of the shaft is to be correspondingly adjusted, appropriate eccentrically applied bearing loads must be available and be in the order of magnitude of tons. When the frictional counter forces at the spherical shells are not overcompensated by the adjusting power, the bearing shell will not be able to carry out the required shifting movement, which causes an undesirable increase in the bearing load in the vicinity of the support and pressure-bearing, and may produce undesired vibration in the shaft-bearing system.

It is an object of the invention to provide a slide bearing in the form of a support pressure-bearing which precludes the above-mentioned difficulties.

It is another object of the invention to provide a support pressure-bearing for rotors of heavy turbine machines, with which an exact adjustment of the bearing body to the shaft journal and the pressure-bearing discs, will occur during operation in the desired direction without requiring great adjusting forces for adjusting of the bearing body. Subsidiary to this object, it is an object of the invention to provide such a support pressure-bearing which is resistant in thrust, pull and bending to large axial and lateral forces.

According to a feature of the invention, a slide bearing is configured as a support and pressure-bearing of the aforementioned type and includes shaft collars disposed on the shaft, the shaft having a longitudinal shaft axis disposed in a vertical shaft plane. The slide bearing has a pedestal and a bearing housing mounted on the pedestal, the housing having mutually adjacent upper and lower housing parts. A bearing structure is disposed in the housing and has bearing surface means for supporting the shaft in the structure. The bearing structure has axial end faces formed as radially extending bearing surfaces for engaging the collars for taking up axial pressure forces of the shaft. The bearing structure has additional bearing surface means for laterally supporting the bearing structure in the housing. The lower housing part comprises a support cantilever mounted on the pedestal and the cantilevered support has a lower spherical dishlike surface bearing for engaging the additional bearing surface means of the bearing structure. The cantilevered support is resilient in a vertical plane containing the shaft axis and is deflectable about a vertical axis in the vertical plane. The support is dimensioned so that its deformation-counter force acting in the region or the dish-like surface bearing at the start of the deflection of the support is less than the friction force between the dish-like surface bearing and the additional bearing surface means of the bearing structure developed in response to a shift of the shaft from its aligned position during operation of the turbine. The upper bearing housing part has an upper spherical dish-like surface bearing for engaging the additional bearing surface means of the bearing structure. The support is sufficiently resistant to buckling and to axial compressive load acting in the direction of gravity and is sufficiently resistant to bending in a plane normal to the shaft axis and transverse to the vertical shaft plane, so that the bearing structure slides at the upper surface bearing and moves the lower surface bearing of the cantilevered support when the shaft shifts from its aligned position during operation of the turbine. The cantilevered support deflecting with the shift of the shaft provided the shifting force of the shaft in the region of the lower surface bearing is less than the friction force developed between the lower surface bearing and the additional bearing surface means of the bearing structure and greater than the deformation counter force of the cantilevered support.

The advantages afforded by the invention lie primarily in the fact that the adjusting power required for the spherical adjustment during operation can be considerably reduced without impairing the stability and rigidity of the bearing in its load direction. For example, adjusting forces can be achieved in the perpendicular plane of the pressure — bearing assembly amounting to several 100 kg whereas, in the known bearing, these forces are typically in the order of magnitude of 5 to 15 t. The cantilevered support is a structural component which features low cost and which can be fitted into the bearing system without requiring a change in dimensions.

In a preferred embodiment, the hinged support is configured as a spring plate having a substantially double-T-shaped cross-section. The upper head portion of the support having the bearing shell or lower spherical dish-like surface bearing and a foot portion that serves to help secure the cantilevered support to the bottom of the bearing block or pedestal. Preferably, safety supports are fixedly mounted to the base or foot portion at both sides of the cantilvered support and are situated such that the free ends of the safety supports and said upper head portion cojointly define respective narrow gaps, the upper portion extending in a flange-like manner over the foot portion. It is also preferable to affix removable ancillary supports at both sides of the cantilevered support which reinforce the support during the encasement of the shaft.

According to another feature of the slide bearing of the invention, pressure bodies are located on both sides of the shaft, in a horizontal plane which runs perpendicularly to the deflection plane of the shaft and extends through the shaft axis. These pressure bodies serve to axially fix the bearing structure with respect to fixed locations on the bearing housing. The pressure bodies being resilient members of high rigidity and so limit lateral deflections of the shaft about the vertical axis, the vertical axis being an axis of rotation and extending through the center of the shaft. The cantilevered support has a spring rigidity — with respect to a torsional deformation about the vertical axis — such that this spring rigidity and the spring rigidity of the pressure bodies — with respect to a deformation of the pressure bodies in response to a lateral deflection of the shaft and bearing structure — cojointly form a resultant spring rigidity that constitutes a deformation counter force, said last-mentioned force being less than the friction counter force opposing a lateral deflection of said bearing structure, said friction counter force being developed between said lower spherical dish-like surface bearing and said additional bearing surface means. In this regard and according to a further feature of the invention, the cantilevered support is preferably provided at its spring plate or web portion with slots which relieve the torsion about its vertical axis of rotation, or the material can be weakened in the web portion.

As with known support pressure-bearings wherein adjustment is made with spherical bearings and is also preferable that the invention have the feature that the upper surface bearing and said lower surface bearing cojointly define a pivot axis about which the shaft pivots in the vertical shaft plane, the pivot axis extending horizontally through the center of the shaft and transverse to the shaft axis. That is, the pivot axis runs through the pressure bodies that are located on respective sides of the shaft and which are preferably resilient. This is done so that the bearing shell or dish-like spherical of the cantilevered will be adjustable about the vertical axis of rotation, when the spherical surfaces are relieved of the thrust forces.

Although the invention is illustrated and described herein as a slide and support bearing for rotors of large turbine machines, it is nevertheless not intended to be limited to the details shown, since various modifications may be made therin within the scope and the range of the claims. The invention, however, together with additional objects and advantages will be best understood from the following description and in connection with the accompanying drawings in which:

Figure 1:
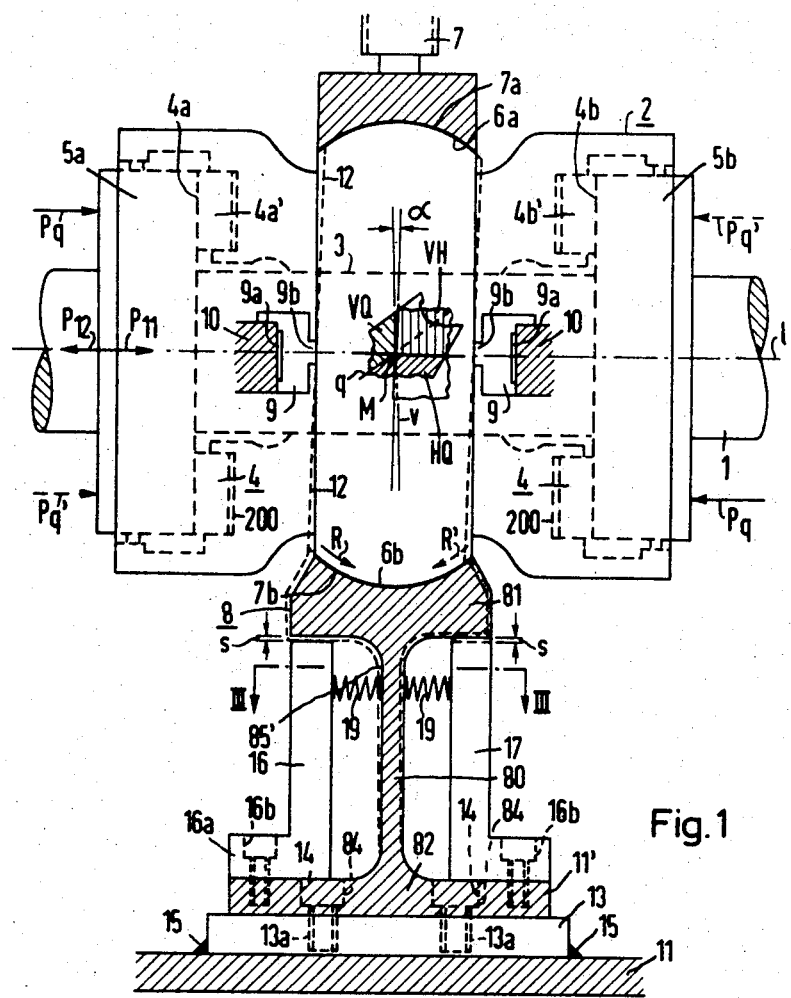
FIG. 1 is a schematic diagram, in longitudinal section, of the support pressure-bearing of the invention.

FIG. 1 shows a glide bearing for a steam-turbine rotor configured as a support pressure-bearing. A portion of the shaft to the rotor is shown within the region of the bearing and is designated by reference numeral 1. The shaft axis is designated by reference letter $l$.

The bearing member 2 has bearing surface means or axial bearing surfaces 3 which support the shaft 1 and also has radial bearing surfaces 4a, 4b at both its end faces. The thrust forces exerted by the shaft are indicated wih arrows P 11 and P 12. One of the bearing surfaces 4a, 4b receives the thrust force according to the direction in which the thrust force acts. Either surface 4a receives the axial pressure forces of shaft 1 which act in the direction P 11 by means of the shaft collar 5a or surface 4b receives the axial pressure forces of the shaft which act in the direction P 12 by means of the shaft collar 5b. The radial bearing surfaces 4a, 4b are located on respective ring members 4a' and 4b' of pressure-bearing blocks 4. The blocks 4 are each disposed in star-like fashion around the shaft axis $l$ and are each pivotable about a radial axis of rotation. The bearing member 2 is adjustably borne with an upper spherical surface 6a against the corresponding upper spherical counter surface 7a of the upper bearing housing portion 7 and is adjustably borne with a lower spherical surface 6b against the corresponding opposite spherical surface 7b of the lower bearing housing portion 8. The surfaces 6a and 6b are additional bearing surface means of the bearing structure 2. As illustrated by the system of coordinates, at the center M of the shaft, the bearing structure 2 is virtually fixed in shaft direction $l$, in transverse direction $q$ and in vertical direction $v$. However, an angular movement of the bearing structure 2 and of the shaft portion 1 is possible at the spherical surfaces 6a, 6b.

In the system of coordinates, aside from the three coordinate directions $l$, $q$ and $v$, the appertaining planes are indicated as well, namely, the vertical longitudinal plane VH, the vertical transverse plane VQ and the horizontal plane HQ. In order to relieve the spherical surfaces 6a, 7a and 6b, 7b of the axial thrust forces P 11, P 12, pressure bodies 9 are arranged on both sides of the shaft 1 in a horizontal plane HQ which extends perpendicularly to the bending plane VH of the shaft 1 and through the shaft axis $l$; these pressure bodies are braced against housing parts 10. The parts 10 are fixed in the housing and are connected for example with the upper, fixed bearing housing part 7. The pressure bodies 9, only two of which are shown in the schematic according to FIG. 1, are arranged, for example, as shown in FIG. 4c, which will be discussed below. The pressure bodies 9 are resiliently deformable. The extent of this deformation is limited in the axial direction $l$ by recesses 9a and by a projection of limited cross-section 9b that engages the bearing member 2, namely, with a relatively high spring rigidity, so that a limited lateral deflection of the shaft 1 and bearing member 2 is possible about the vertical line $v$, the latter serving as a rotation axis.

Part 8 of the bearing housing which are arranged below the axial partition (plane HQ) and define the lower spherical shell 7b brace against the bottom of the bearing block 11 through a cantilevered support 80 which can resiliently deflect in the direction of the vertical axial plane VH and deflect about the vertical rotational axis $v$. This cantilevered support 80 is constructed so that its deformation counter-force, which is effective in the region of the spherical joint faces 7b, 6b is less than the friction counter forces R or R' of the spherical interface surfaces 6b, 7b produced during operation by a shaft deviation from the aligned position. The cantilevered support 80 is dimensional to be sufficiently pressure and buckle resistant in the load or gravity direction $v$, and to have adequate bending resistance in the direction of the plane VQ normal to the axis and which is transverse to the plane VH. This is illustrated by the pair of forces Pq, Pq which acts in the region of the shaft collars 5a, 5b and which exerts a moment on the shaft 1 and therewith on the bearing member 2 about the horizontal axis of rotation $q$. This pair of forces can occur, for example, in response to a change in the operational bending line of the rotor or the shaft 1.

Because of the considerable weight of the rotors of turbine machines, particularly steam-turbine rotors, the pressure within the region of the spherical interface surfaces 6b, 7b, is relatively large, so that, in general, the frictional counter force R in the region of the spherical interface surface 6b, 7b can be overcome only with pairs of forces in the order of magnitude of several tons such as 10 t and more, so that the bearing body 2 can carry out an appropriate angular movement. Since the upper spherical interface surfaces 7a, 6a, are not weight loaded and are adjusted relative to one another with a tight tolerance of about 5/100 mm, it is possible for these spherical interface surfaces to slide with respect to each other. The spherical shell 6b can be taken along without necessitating a sliding movement between spherical joint faces 6b, 7b because of the configuration of the cantilevered support 80 when the latter deflects laterally; this action is illustrated by the contour outlined by the dashed line 12. This action can only be effected as long as the adjusting power of the shaft 1 within the region of the lower spherical interface surfaces 6b, 7b is less than the frictional force R acting between the lower spherical surface 6b and the spherical counter surface 7b and greater than the deformation counter force of the cantilevered support 80. If the adjusting power of the shaft overcomes the frictional counter force R, there can of course be a sliding of the spherical interface surfaces 6b, 7b relative to each other, in addition to the deflection of the hinged support 80. The clockwise frictional force R' would be effective in the region of the spherical interface surface 6b, 7b, if a pair of forces Pq', Pq' acting in counter-clockwise direction were present.

Figure 2:
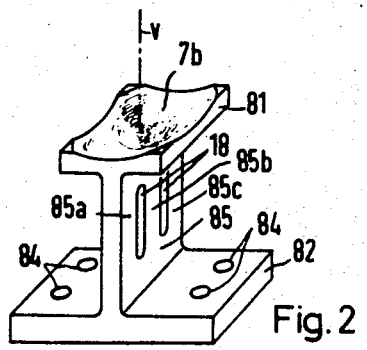
FIG. 2 shows the cantilevered support of the bearing of FIG. 1 in perspective and at a reduced scale.

The spherical shell 7a of the upper bearing housing parts 7 and the spherical shell 7b of the cantilevered support define an axis of rotation $q$ for the shaft deflections occurring in the vertical axial plane VH. The axis of rotation $q$ extends through the shaft center M and transversely to the direction of the shaft axis. Referring to FIG. 2, the cantilevered support 80 is constructed as a spring plate having an essentially double-T-shaped cross-section. The cantilevered support 80 has an upper head portion 81 containing the bearing shell 7b as well as a lower foot portion 82 that serves to secure the support 80 to the bearing pedestal or base 11. The cantilevered support 80 is tightly bolted to an intermediate plate 13 of the bearing pedestal 11 so as to be adjustable by means of screws 14. The intermediate plate 13 is, for example, welded to the base 11 as indicated by welding seams 15. The base portion 82 of the support 80 has safety supports 16 on both sides thereof; these supports 16 are configured so that a narrow gap $s$ is defined with respect to the lower side 83 of head portion 81.

The safety supports 16 have an L-shaped profile and are tightly secured with threaded bolts 16b at their base portions to the base portion 82 of cantilevered support 80, preferably, so as to be adjustable. The safety supports 16 serve to prevent an extreme deflection of the support 80 which would destroy the latter in case of unexpected disturbances which can sometimes exceed the load limits of the cantilevered support 80 that is nevertheless constructed to withstand loads in excess of those occurring during normal operation. In FIG. 1, the safety support 16 is shown standing behind an auxiliary support 17 on the right side of the support 80. The auxiliarly support 17 is also situated on the left side of the cantilevered support 80 but is not shown there. That is, two auxiliary supports 17 as shown on the right side of support 80 and which are constructed similarly to the safety support 16 and which likewise can be secured to the base portion 82, have no gap with respect to the head portion 81, since they serve only to reinforce the cantilevered support 80 when the shaft is placed in position and are removed thereafter, as is the case also after the installation of the axial pressure bodies of the bearing member.

During the time that the shaft is positioned, the support 80, with its spherical shell 7b, is precisely aligned to the spherical surface 6b in the three directions $l$, $q$ and $v$. If necessary, shims of variable thickness, not shown in the drawing, are used in making this alignment. Preferably, the cantilevered support 80 is movable with respect to the bearing pedestal 11 in direction $q$ and longitudinal direction $l$. This can be performed by placing an intermediate plate 13 on the bearing pedestal 11 in slidable relation thereto and by fixing its position by means of welding seams 15. Basically, also the heads of the threaded bolts 14 which threadably engage the threaded bores 13a of plate 13, can be placed with clearance with respect to their corresponding receiving bores 84. The upper housing portions 7 are aligned in the three directions $l$, $q$, $v$ with respect to the spherical surfaces 6a. After the shaft is aligned, the auxiliary supports 17 positioned on both sides of the support 80 are removed. The bearing shell 2 is so adjusted during operation, that a slight bending of the cantilevered support, which is preferably made of resilient steel, takes place in its head region 81 by an amount equal to approximately ± 0.1 mm. The small bending of the cantilevered support of 0.1 mm during alignment affords a stable position of the support which is statically determined and is therefore desirable. Furthermore, it facilitates yielding of the cantilevered support during angular movements of the shaft about the transverse axis $q$.

During operation, the cantilevered support is then in a position to take up a required shift of about 0.2 to 0.3 mm in the region of its head portion 81, as indicated by angle $\alpha$. Experience has shown that relatively low adjustment forces of the shaft are necessary to adjust or deflect the cantilevered support in its pendular plane VH, namely, in the order of magnitude of several 100 kg, provided they correspond to the approximate points of contact and the direction of the illustrated pair of forces Pq.

Together with the resilient pressure bodies 9, the cantilevered support 80 is moreover constructed and dimensioned with such spring rigidity with respect to a torsional deformation around the vertical axis of rotation $v$, that the support 80 in combination with the spring rigidity of the pressure bodies 9 with regard to their deformation during a corresponding lateral deflection of the shaft or the bearing body, provide a resultant spring rigidity and thus a resultant deformation counter force that is less than the friction counter force occurring at the lower spherical interface surfaces 6b, 7b and acting against the lateral deflection of the bearing body 2.

FIG. 2 shows that the necessary torsional slackness about the vertical axis of rotation $v$, may be obtained by means of slot-shaped openings 18, in the region of the resilient plate portions 85. In lieu of the slots, a weakening of the web portion material can be achieved by otherwise modifying the web cross-section.

The slots 18 extend essentially parallel to the vertical axial plane VH and divide the resilient plate portion 85 into three bridge struts 85a, 85b, 85c, which are all approximately the same width. The assembly of FIG. 1 may be further augmented by installing shock and vibration dampers 19 between deflectable parts of the support 80, that is, preferably between the upper resilient plate portions 85' and a fixed abutment. The safety support arrangement serves here as an abutment. In the right portion of FIG. 1, the safety support 16 is shown in dashed outline behind auxiliary support 17.

Figure 3:
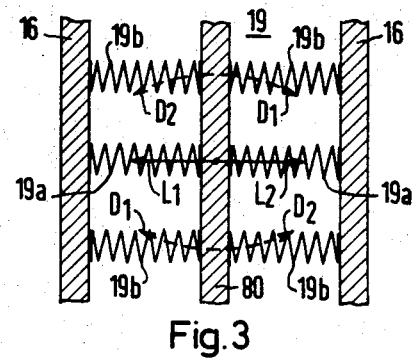
FIG. 3 is a view partically in section, of the cantilevered support taken along line III—III of FIG. 1, this view also showing the shock absorbers in schematic representation.

As FIG. 3 shows, the shock and vibration dampers 19 may be subdivided into damper 19a which attenuates vibrations in the pendular plane VH and damper 19b which attenuates torsional vibrations of the cantilevered support 80, or more specifically, the torsional vibrations about the vertical axis of rotation $v$. Since the illustrated dampers 19 attenuate only in response to a pressure load, one damper 19a is provided on each side of the spring plate 85 for both pendulum directions L1, L2, and rotational vibration damper pairs 19b are provided for the rotating movements D1 in clockwise direction and the rotating movements D2, in counter-clockwise direction, respectively. The vibration and shock dampers may be known components used in machine construction such as hydrostatic pressure springs or the like.

The individual pressure bearing blocks 4 of a rim 4a' or 4b' are individually positioned in shaft-axis direction 1 with limited resiliency. Appropriate spring rings are disposed in the intermediate spaces 200. This affords the advantage of an almost uniform support of the bearing surfaces 4a within a rim 4a' or 4b' if the shaft bends, no matter how slight, between the two pressure bearings.

Figure 4A:
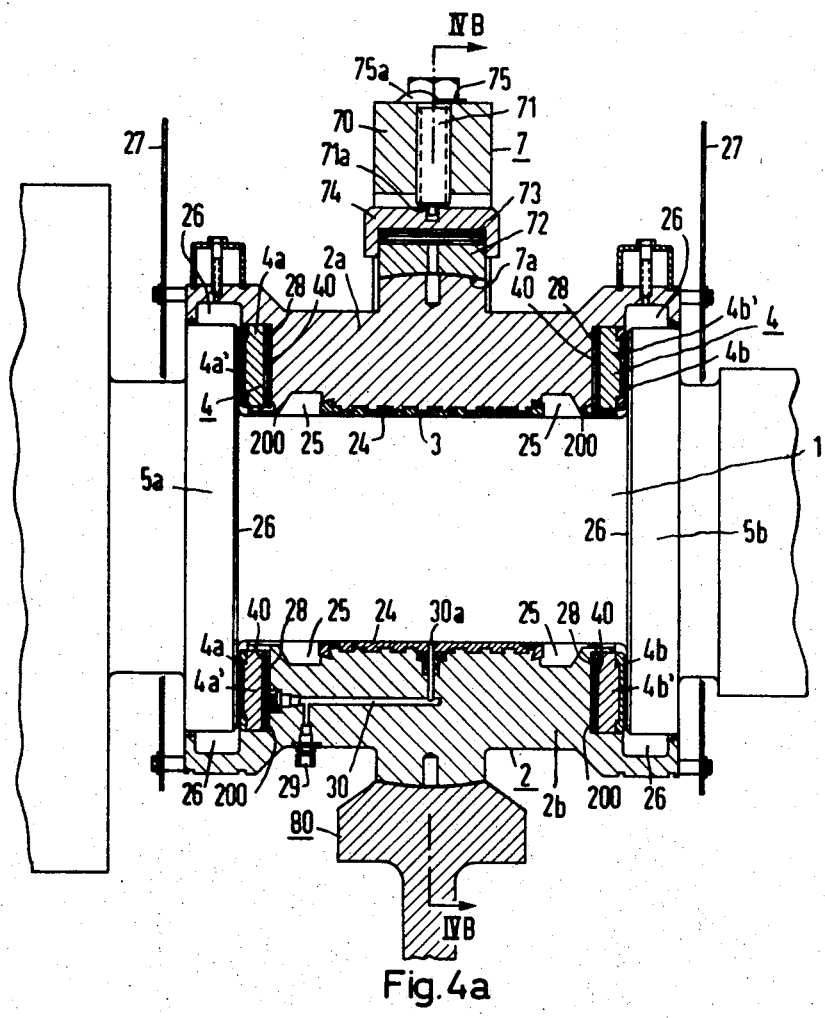
FIGS. 4a to 4c show in longitudinal section, in cross-section and in plan view, respectively, the carrier-pressure bearing of FIG. 1 in detailed illustration.
Figure 4B:
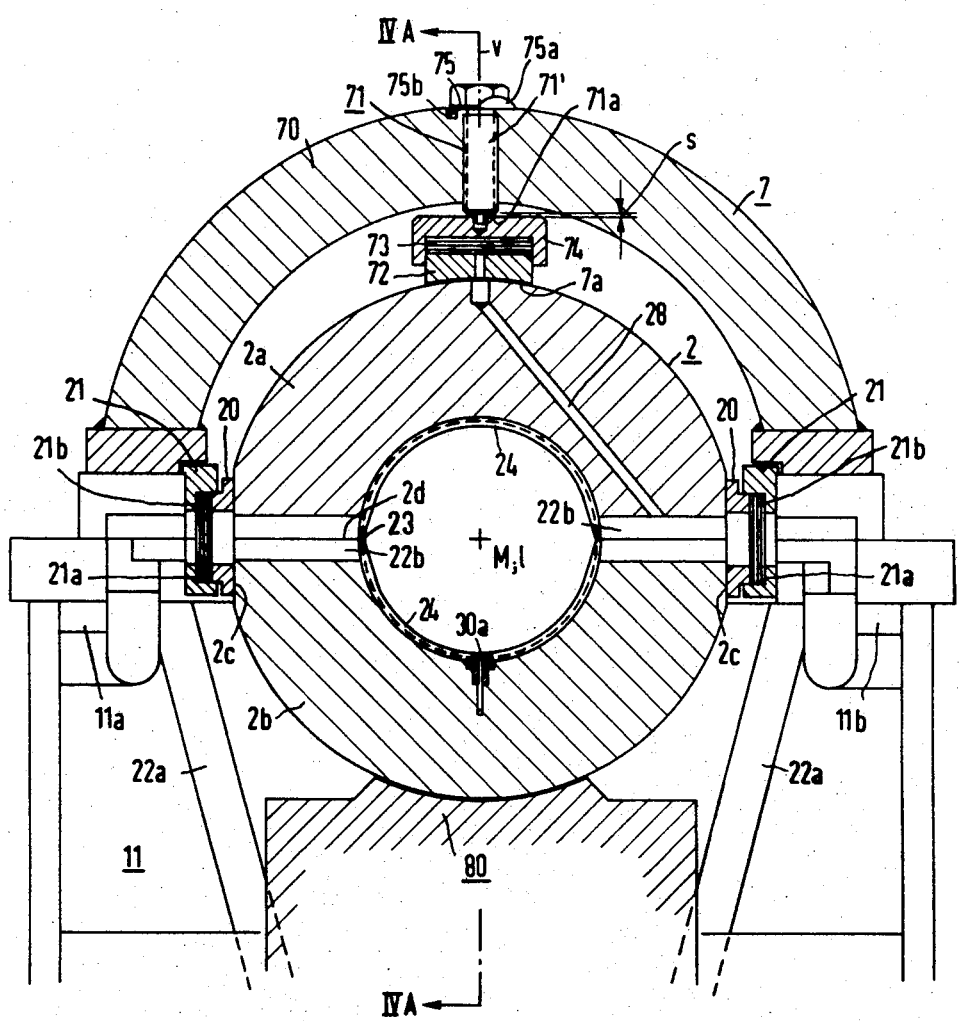
Figure 4C:
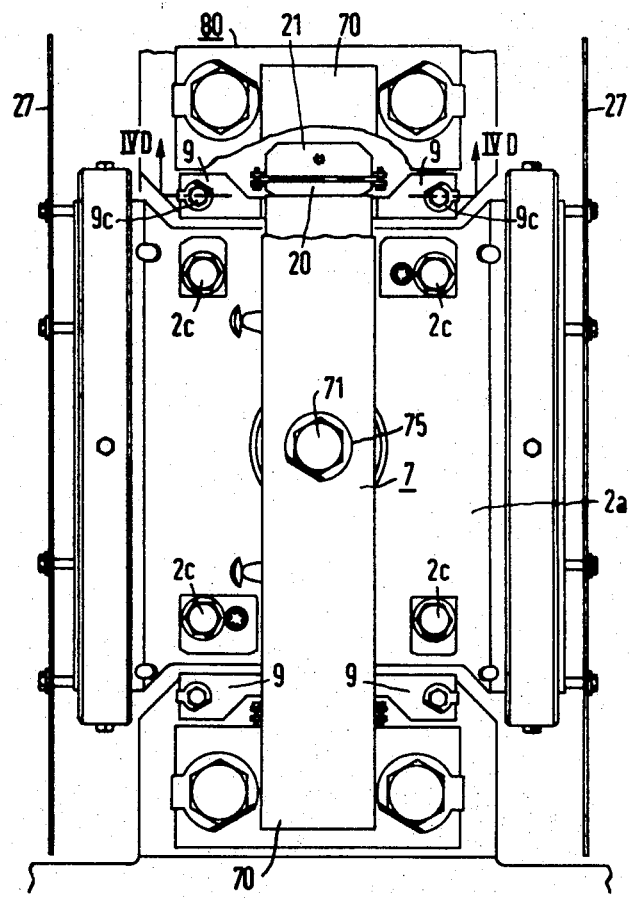

In FIGS. 4a to 4d, the same parts of FIGS. 1 to 3 have the same reference numerals. In FIG. 4b, the lower parts of the cantilevered support 80 and of the mounting pedestal 11 are not shown. Of the latter are visible the two lateral portions 11a, 11b which are bridged by a bearing bracket 70 of beairng housing 7. The bearing bracket 70 is flange-secured to the lateral portrions 11a, 11b. An adjusting device 71 which is schematically illustrated in FIG. 1 is borne in bearing bracket 7. The device 71 has an adjusting screw 72 that extends in the direction of the vertical center axis $v$. The member 72 has the spherical surface 7a and is supported in a holding member 74 with interpositioned oil-drenched damping plates 73. The holding member 74 is disposed opposite the front face 71a of the adjusting screw 71 with clearance S of about 5/100 mm. The adjusting screw 71 has a sheet member 75 with a sharply bent fin 75a to safeguard against turning. The sheet member 75 is affixed at the bearing housing 70 by means of the set screw 75b.

The bearing body 2 comprises both shell halves 2a, 2b which are clamped together by tension bolts 2c at both sides of the shaft axis 1 as shown in FIG. 4c. The bearing shell halves 2a, 2b have planar surfaces 2e at the region of their interface 2d; these surfaces 2e extend axial-parallel to the plane VH. Insert bodies 20 lie against the surfaces 2e and are held in pockets 21a of holding members 21 by interpositioning oiled damping laminations 21b. The holding members 21 are held on the lateral angle portions 11a and 11b respectively of the bearing block 11. Through pressure-oil channels 22a, 22b, pressure oil is being pumped into the lemon-shaped bearing opening 23 which is formed between the white-metal lining 24 and the outer periphery of the shaft portion 1 (see FIGS. 4a,4b). The pressure oil rinses, in both axial directions, the respective stationary bearing surfaces 3 and 24 as well as the carrier surfaces of the shafts 1. Through ring chambers 25, the pressure oil reaches the respective pressure-bearing surfaces 4a and 4b of the pressure-bearing block rims 4a' and 4b', respectively. The shaft collars 5a and 5b are in sliding engagement with block rims 4a' and 4'b, respectively. The pressure oil enters radially into ring chambers 26 where in collects and is directed away through outlet bores not illustrated. Reference numeral 27 designates spray catch sheets which surround the shaft portion 1 in the region of the ring grooves 28 and which prevent the oil from being sprayed to the outside.

The oil-lubricated damper sheets 21b are rinsed directly with oil since the pressure-oil channel 22b passes directly through an opening in sheets 21b, whereas, the damper sheets 7d are supplied with oil through a branch channel 28. The weight of the shaft received is by the cantilever support 80 by means of the bearing body 2. The bearing body 2 is supported against lateral forces at its planar surfaces 2e by means of the inserted members 20 which are affixed to the bearing block 11 at its lateral angle portions 11a, 11b. However, this lateral support cannot prevent a tilting movement of the bearing body 2 about the horizontal transverse axis q nor a slight tilting movement about the vertical rotation axis v because the damping sheets 21c have a certain elasticity.

The tilting movement about the horizontal transverse axis 2 is also permitted by the pressure bodies 9, as previously explained, which relieve the spherical surfaces 6a, 7a and 6b, 7b of axial thrust forces. The indicated spherical surfaces are also relieved of lateral forces through the support 20, 2e at both sides of the bearing body 2. The damper laminations 21b as well as 73 act as vibration attenuators for the shaft and the bearing body 2 with regard to bearing vibrations.

FIG. 4a shows in more detail that the rear sides 40 of the respective pressure bearing blocks 4 are supported by spring rings 28 which are disposed in the spaces 200. As a result, in addition to the tilting movement of the individual blocks 4 about their radial tilting axes, an elastic deflection in axial direction is still possible as was described with reference to FIG. 1. Reference numeral 29 designates still another pressure oil line to a channel system 30 which permits, through an outlet bore 30a, lifting and lubricating the shaft portion 1 with pressure oil during the movements of the turbine shaft.

In FIG. 4c, a part of the bearing bracket 70 is broken away, in order to make the insert body 20 and the holding member 21 as well as the force application of the pressure bodies 9 visible. The pressure bodies 9 are more clearly visible in section in FIG. 4d and are affixed with holding screws at 9c to respective lateral portions 11a and 11b of the bearing block 11. The pressure bodies are resilient to a limited degree in the direction of arrows 290 because of the arrangement and construction of the recess 9a and the projections 9b. A further improvement in the elastic yielding action can be achieved through an embodiment according to FIG. 5 wherein two pressure bodies 9', 9'' are connected one behind the other. The force application occurring on the bearing shells 2a, 2b is again applied at the projections 9b.

Figures 4D, 5:
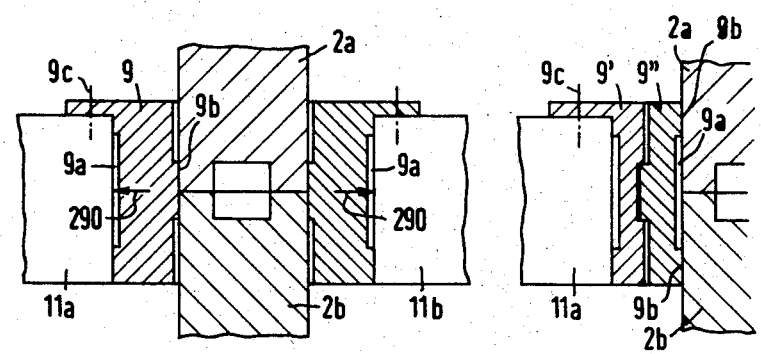
FIG. 4d is a detailed view of the pressure bodies taken at line IVd–IVd of FIG. 4c; and, FIG. 5 is an alternate embodiment of the pressure bodies shown in detail and corresponding in location to FIG. 4d.

Even though FIG. 5 shows only one such a pressure body 9', 9'', it is understood that several such pairs of pressure bodies 9',9'' were inserted into the appertaining recesses according to the arrangement of FIG. 4c. As previously mentioned, a suitable material for the cantilevered support is a steel of high elasticity such as the type HSB which is a tensile, weldable, finery grained construction steel as used in steel and bridge construction. Such a steel has a yield strength Fy equal to or greater than 30 to 35 kp/mm².

It is claimed:

1. Slide bearing in the form of a support pressure-bearing for turbine machine shaft members such as the shaft of a steam turbine rotor or the like, the shaft being aligned in the bearing and having a longitudinal shaft axis disposed in a vertical shaft plane, comprising shaft collars disposed on the shaft, a pedestal, a bearing housing mounted on said pedestal, said housing having mutually adjacent upper and lower housing parts, a bearing structure disposed in said housing and having bearing surface means for supporting the shaft in said structure, said bearing structure having axial end faces formed as radially extending bearing surfaces for engaging said collars for taking up axial pressure forces of the shaft, said bearing structure having additional bearing surface means for laterally supporting said structure in said housing, said lower housing part comprising a support cantilever mounted on said pedestal, said cantilevered support having a lower spherical dish-like surface bearing for engaging said additional bearing surface means of said bearing structure, said support being resilient in a vertical plane containing the shaft axis and being deflectable about a vertical axis in said vertical plane, said support being dimensioned so that its deformation-counter force acting in the region of said dish-like surface bearing at the start of said deflection of said support is less than the friction force between said dish-like surface bearing and said additional bearing surface means of said bearing structure developed in response to a shift of the shaft from its aligned position during operation of the turbine, said upper bearing housing part having an upper spherical dish-like surface bearing for engaging said additional bearing surface means of said bearing structure, said support being sufficiently resistant to buckling and to axial compressive load acting in the direction of gravity and being sufficiently resistant to bending in a plane normal to the shaft axis and transverse to the vertical shaft plane, so that said bearing structure slides at said upper surface bearing and moves the lower surface bearing of said cantilevered support when the shaft shifts from its aligned position during operation of the turbine, said cantilevered support deflecting with the shift of the shaft provided the shifting force of the shaft in the region of said lower surface bearing is less than the friction force developed between said lower surface bearing and said additional bearing surface means of said bearing structure and greater than the deformation counter force of said cantilevered support.

2. Slide bearing of claim 1, said upper surface bearing and said lower surface bearing conjointly defining a pivot axis about which said shaft pivots in the vertical shaft plane, said pivot axis extending horizontally through the center of the shaft and transverse to the shaft axis.

3. Slide bearing of claim 1, said cantilevered support being a spring-like plate member having a double-T-shaped cross-section, said support having upper and lower portions, said lower spherical dish-like surface bearing being formed in said upper portion of said support, said lower portion of said support being secured to said pedestal.

4. Slide bearing of claim 3 wherein said upper portion of said support extends flange-like to respective sides of said support in the direction of the shaft axis, and wherein said lower housing part comprises safety supports secured to said lower portion of said support on respective sides of the latter, the free ends of said safety supports and said upper portion conjointly defining respective gaps.

5. Slide bearing of claim 4, said lower housing part comprising removable ancillary supports affixable to respective sides of said cantilevered support for strengthening the latter when the shaft is mounted in the slide bearing.

6. Slide bearing of claim 1, comprising pressure bodies disposed on respective sides of the shaft, said pressure bodies being located in a horizontal plane extending perpendicular to said vertical plane and containing the shaft axis, the shaft deflecting in said vertical plane, said pressure bodies serving to axially fix the bearing structure with respect to fixed locations on the bearing housing, said pressure bodies being resilient members of high rigidity so as to limit lateral deflections of the shaft about the vertical axis, said vertical axis being an axis of rotation and extending through the center of the shaft, said cantilevered support having a spring rigidity — with respect to a torsional deformation about the vertical axis — such that said spring rigidity and the spring rigidity of said pressure bodies — with respect to a deformation of said pressure bodies in response to a lateral deflection of the shaft and bearing structure — conjointly form a resultant spring rigidity that constitutes a deformation counter force, said last-mentioned force being less than the friction counter force opposing a lateral deflection of said bearing structure, said friction counter force being developed between said lower spherical dish-like surface bearing and said additional bearing surface means.

7. Slide bearing of claim 6, said cantilevered support having a web portion serving as a spring plate, said web portion having slots formed therein for facilitating torsion action about said vertical rotation axis.

8. Slide bearing of claim 6, said cantilevered support having a web portion serving as a spring plate, said web portion consisting of weakened material for facilitating torsion action about said vertical rotation axis.

9. Slide bearing of claim 1, said lower housing part comprising shock and vibration dampers connected between the deflectable portion of said cantilevered support and said pedestal.

10. Slide bearing of claim 1, comprising ring members of pressure bearing blocks disposed about the shaft and pivotable about radial rotation axes respectively, each of said blocks being resiliently borne so as to be limited in the direction of the shaft axis.

* * * * *